United States Patent
Rosellini et al.

(10) Patent No.: US 9,682,742 B2
(45) Date of Patent: Jun. 20, 2017

(54) MOTORCYCLE SUSPENSION (71) Applicant: PIAGGIO & C. S.p.A., Pontedera (IT)

(72) Inventors: Walter Rosellini, Pontedera (IT); Simone Pallini, Pontedera (IT)

(73) Assignee: PIAGGIO & C. S.P.A., Pontedera, Pisa (IT)

(*) Notice: Subject to any disclaimer, the term of this patent is extended or adjusted under 35 U.S.C. 154(b) by 0 days.

(21) Appl. No.: 14/891,411

(22) PCT Filed: Apr. 17, 2014

(86) PCT No.: PCT/IB2014/060791
§ 371 (c)(1),
(2) Date: Nov. 16, 2015

(87) PCT Pub. No.: WO2014/184690
PCT Pub. Date: Nov. 20, 2014

(65) Prior Publication Data
US 2016/0083041 A1    Mar. 24, 2016

(30) Foreign Application Priority Data
May 16, 2013   (IT) .............. PD2013A0136

(51) Int. Cl.
*B62K 25/16*   (2006.01)
*B62K 25/12*   (2006.01)
*B62K 25/00*   (2006.01)
*B62K 21/02*   (2006.01)

(52) U.S. Cl.
CPC ............. *B62K 25/12* (2013.01); *B62K 21/02* (2013.01); *B62K 25/005* (2013.01); *B62K 25/16* (2013.01)

(58) Field of Classification Search
CPC ....... B62K 25/12; B62K 25/005; B62K 25/16
USPC ......................................... 280/276
See application file for complete search history.

(56) References Cited

U.S. PATENT DOCUMENTS

| | | | |
|---|---|---|---|
| 4,180,280 A | 12/1979 | Doveri | |
| 5,361,864 A * | 11/1994 | Tanaka | B62K 25/24 180/219 |
| 5,931,487 A * | 8/1999 | Koppelberg | B62K 25/08 280/124.104 |

(Continued)

OTHER PUBLICATIONS

International Search Report dated Jul. 7, 2014.

*Primary Examiner* — Tony Winner
*Assistant Examiner* — Michael Stabley
(74) *Attorney, Agent, or Firm* — Arent Fox LLP; Michael Fainberg (57) ABSTRACT

A motorcycle suspension comprising a fork having a steering bar suitable for connecting mechanically to a steering mechanism of a motorcycle, an oscillating bar having a first end at which it forms a junction with said steering bar, and a second end at which it connects to a support which houses a rotation pin of an associable wheel so as to turn, said rotation pin defining a rotation axis for the wheel itself. The suspension comprises a shock absorber unit which extends from an attachment head, at which it is mechanically connected to the steering bar, to an attachment foot, at which it is connected to the support. Advantageously, the shock absorber unit, at the attachment foot, connects to the support by the interposition of mechanical coupling means having a hinge axis which is contained in a plane perpendicular to the rotation axis of the wheel.

13 Claims, 5 Drawing Sheets

(56) References Cited

U.S. PATENT DOCUMENTS

| | | | | |
|---|---|---|---|---|
| 6,336,647 B1 * | 1/2002 | Iwai | ..................... | B62K 25/08 |
| | | | | 180/219 |
| 6,485,043 B2 * | 11/2002 | Ito | ......................... | B62K 25/24 |
| | | | | 280/275 |
| 7,648,000 B2 * | 1/2010 | Kimura | ................ | B62K 21/005 |
| | | | | 180/219 |

* cited by examiner

MOTORCYCLE SUSPENSION

CROSS-REFERENCE TO RELATED APPLICATIONS

This application is a National Stage entry of International Application No. PCT/IB2014/060791 filed Apr. 17, 2014, which claims priority to Italian Patent Application No. 102013902156489, filed May 16, 2013. The disclosures of the prior applications are hereby incorporated in their entirety by reference.

FIELD OF APPLICATION

The present invention relates to a motorcycle suspension, and in particular a front motorcycle suspension.

BACKGROUND ART

In the field of motorcycles, and in particular mopeds, it is known to use, at the front section, an oscillating bar suspension.

In particular, it is a single bar, therefore asymmetric, system consisting of a fork with a single rigid bar, also called steering bar, on which an oscillating bar forms a junction, called pack, facing towards the rear, which ends on the wheel pin.

The steering bar is mechanically linked to the steering wheel of the motorcycle.

Moreover, the shock absorber unit typically consisting of a spring and a shock absorber, is attached on the oscillating bar.

The shock absorber unit mechanically connects the rigid fork with the wheel pin to each other, so that altogether the suspension takes the shape of a parallelogram.

Usually, the shock absorber unit is connected tightly to the wheel pin and to the fork: typically the foot, or lower end of the shock absorber unit, is connected to the wheel pin by a rigid bracket. From a theoretical point of view, the shock absorber unit always works in pure axial compression condition, since the forces exchanged between the wheel and the body are absorbed by the oscillating bar and the single bar fork.

Actually, however, because of the clearances and deformations of the mechanical components, the shock absorber unit does not always work in the theoretical pure axial compression condition but is subject to a bending moment which tends to oppose the sliding between the lining and the stem of the shock absorber unit itself.

The deformations and thus the jamming of the shock absorber unit increase when the connection bracket of the shock absorber unit to the wheel pin is used as an element of support and fixing of the front brake, typically of the disk type. In this case, in fact, the brake transmits considerable strength and torques to the foot which tend to further deform the bracket connecting the foot of the shock absorber unit and thus to lose the straightness and relative coaxiality between the lining and the stem. The result is a difficult sliding of the shock absorber unit and a non-optimal behavior of the front end, further worsened during the braking action.

DISCLOSURE OF THE INVENTION

In order to solve said problems, no improving solutions are known in the art: for this reason, the use of such a suspension with oscillating bar is confined to low performance and limited mass motorcycles.

Alternatively, there are also solutions that reduce the deformation of the front end components by oversizing the components themselves. Such solutions, however, besides being expensive and unaesthetic, increase unsprung masses, or ground masses, worsening the dynamic behavior of the suspension and thereby of the motorcycle.

The need of solving the drawbacks and limitations mentioned with reference to the prior art is therefore felt.

Such object is achieved by a suspension according to claim 1.

DESCRIPTION OF THE FIGURES

Further features and the advantages of the present invention will appear more clearly from the following description of preferred non-limiting embodiments thereof, in which.

Elements or parts of elements in common between the embodiments described below are referred to with the same reference numerals.

DETAILED DESCRIPTION

Figure 1:
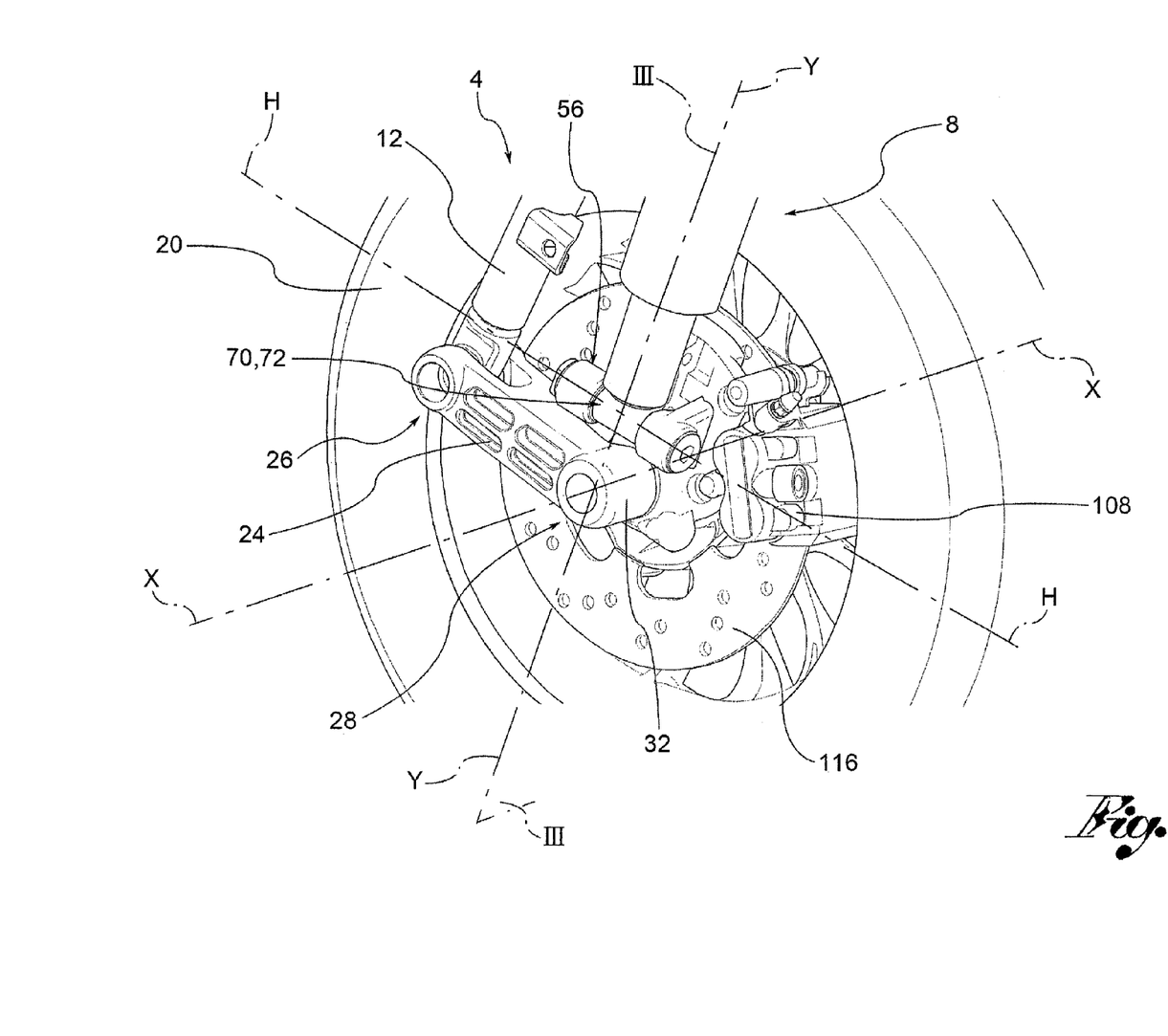
FIG. 1 shows a perspective view of a motorcycle suspension according to the present invention.
Figure 2:
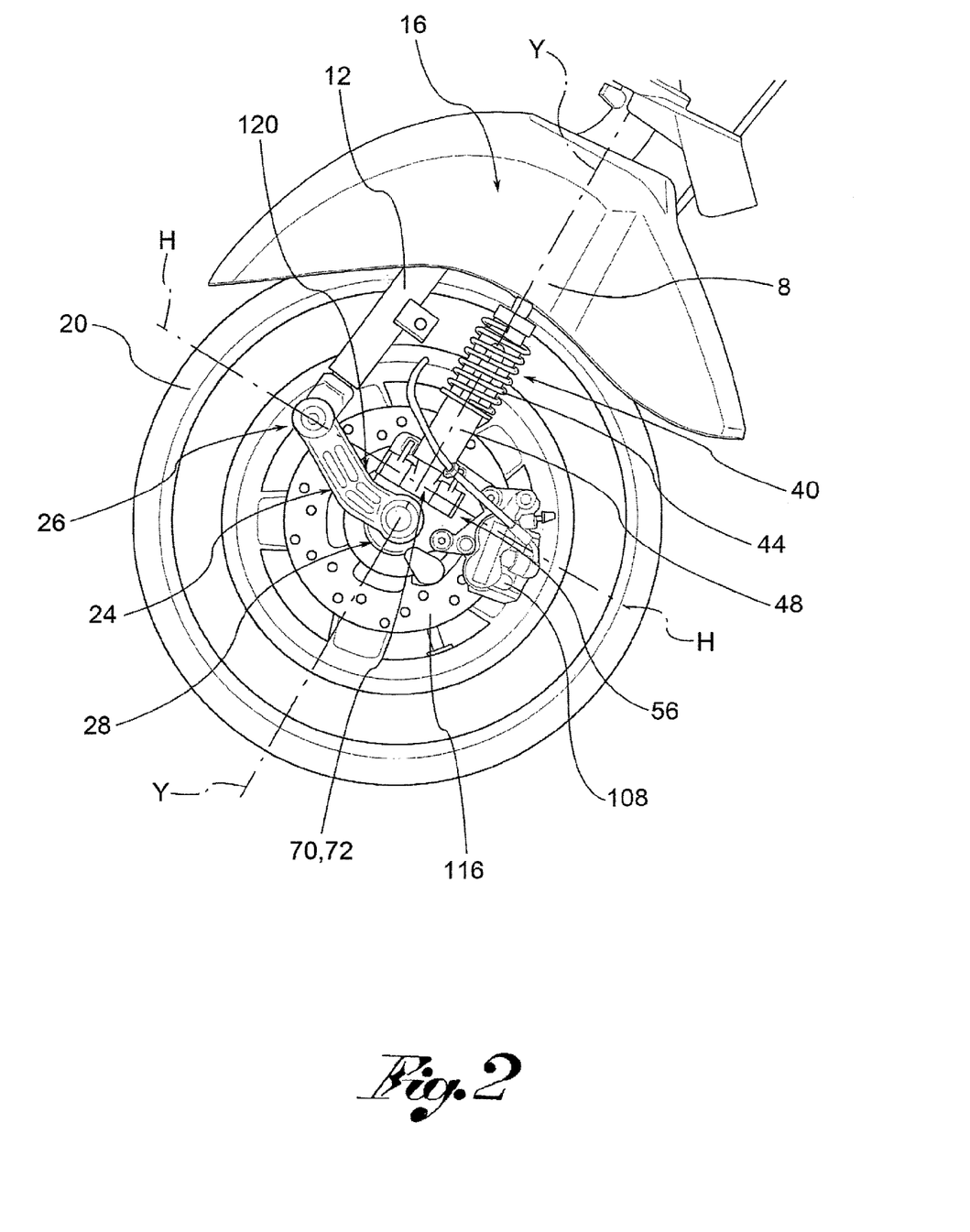
FIG. 2 shows a side view of a motorcycle suspension according to a further embodiment of the present invention.
Figure 3:
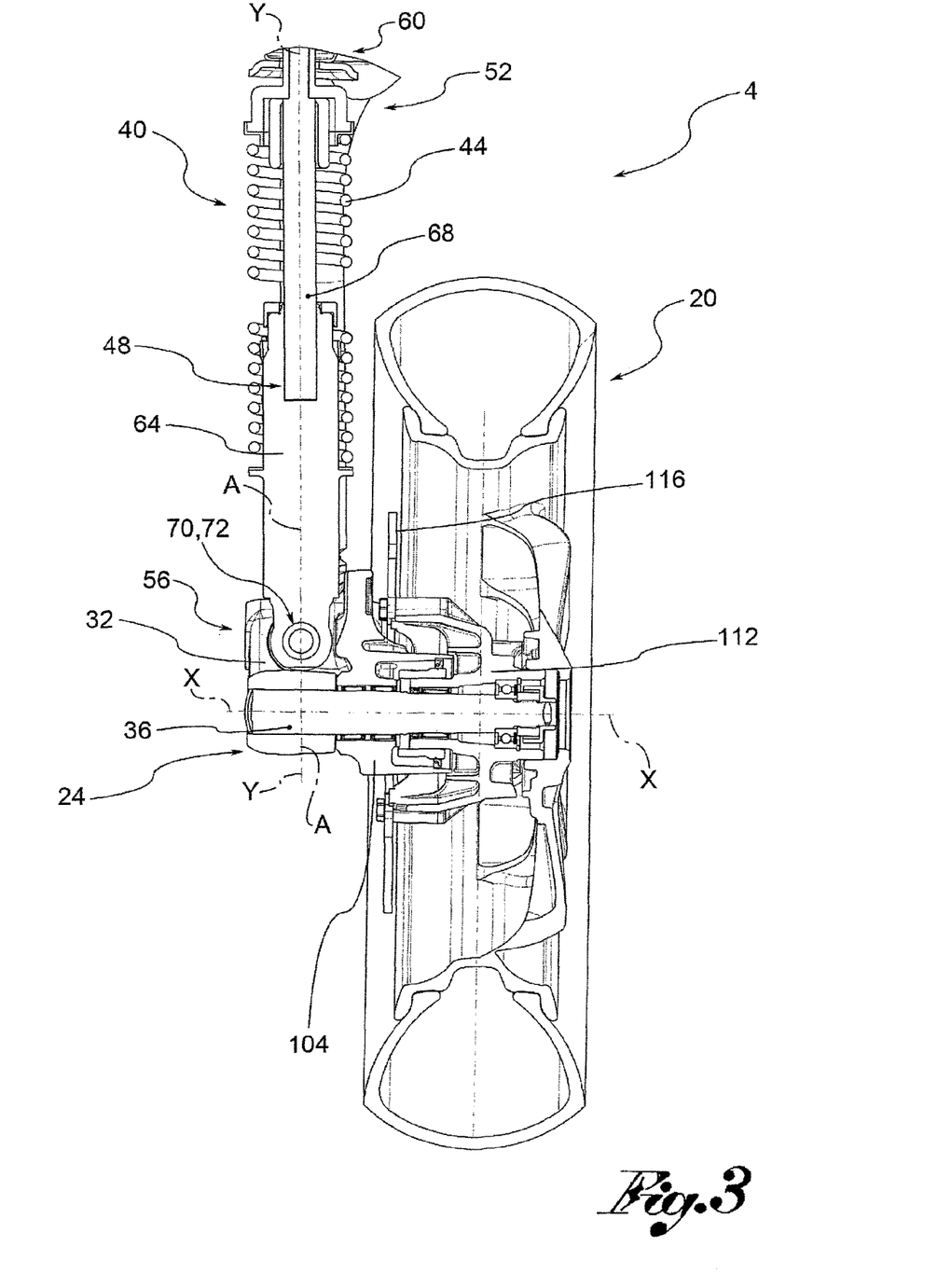
FIG. 3 shows a sectional view of a suspension according to the present invention along the section plane III-III in FIG. 1.
Figure 4:
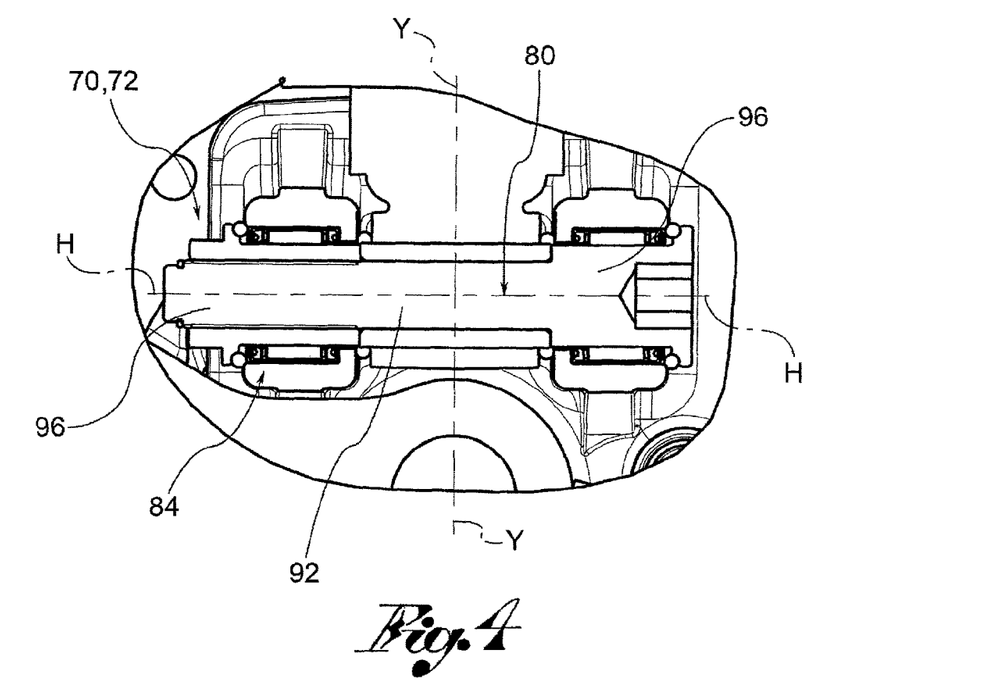
FIGS. 4-7 show sectional views, along the section plane A-A in FIG. 3, of a detail of the motorcycle suspension according to embodiment variants of the present invention.
Figure 5:
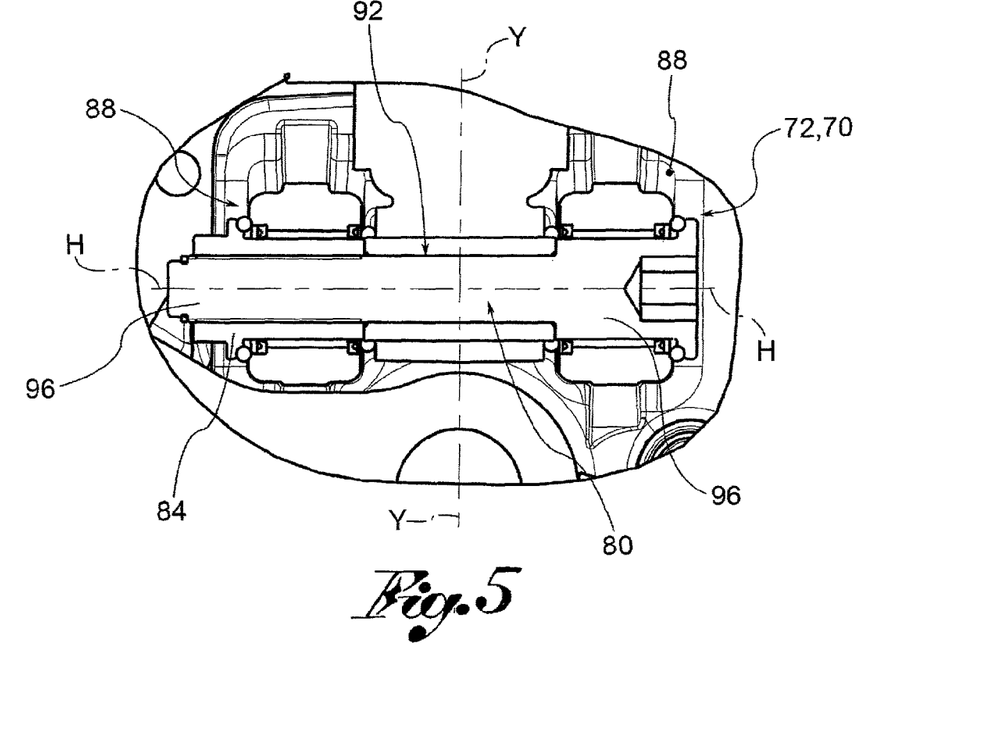
Figure 6:
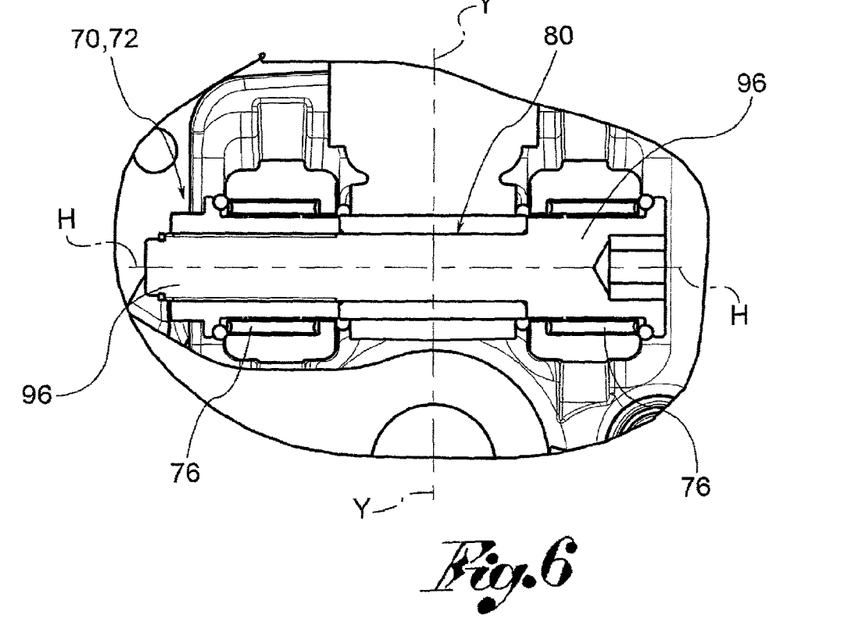
Figure 7:
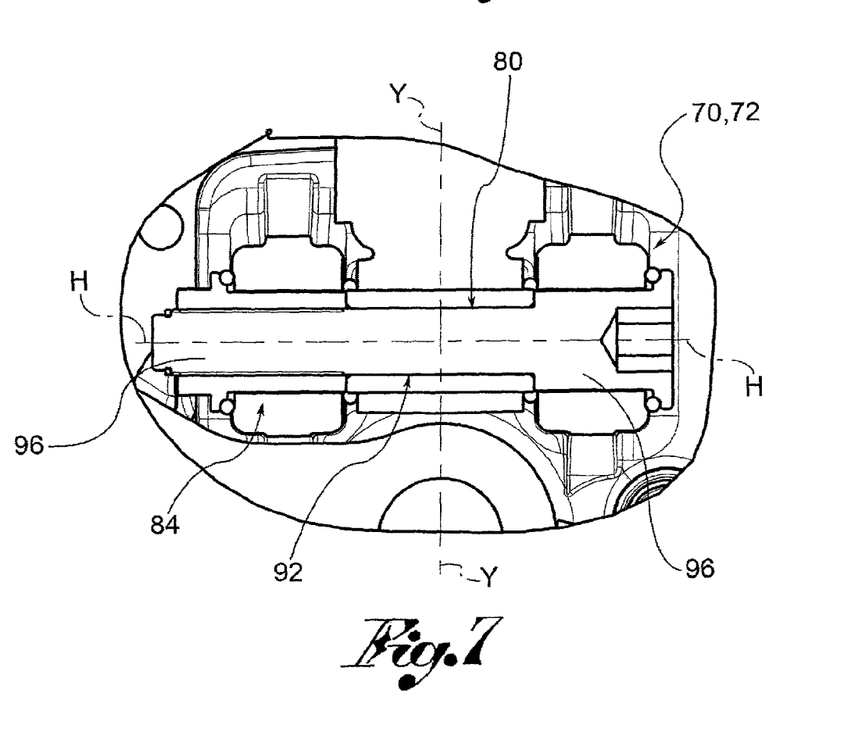

With reference to the above figures, reference numeral 4 globally indicates a motorcycle suspension according to the present invention.

For the purposes of this invention, it should be noted that the term motorcycle must be considered in a broad sense, encompassing any motor cycle having at least two wheels, i.e. one front wheel and one rear wheel. Therefore, this definition also includes three-wheel motorcycles, such as two paired and steering wheels on the front end and one driving wheel at the rear, but also motorcycles that include only one wheel, steering, on the front end and two driving wheels at the rear. Finally, the definition of motorcycle also includes the so-called quads, with two wheels at the front end and two wheels at the rear end.

The motorcycle suspension 4 comprises a fork 8 having a rigid bar or steering bar 12 suitable for connecting mechanically to a steering mechanism 16 of a motorcycle. The fork is preferably single-bar, asymmetrical relative to a centerline longitudinal plane of the suspension itself, passing by a front wheel 20 of the motorcycle.

The motorcycle suspension 4 comprises an oscillating bar 24 having a first end 26 at which it forms a junction with said steering bar 12, and a second end 28 at which it connects to a support 32 which houses a rotation pin 36 of an associable front wheel 20 so as to turn.

Said rotation pin 36 defines a rotation axis X-X for the wheel 20 itself. The rotation axis X-X of the wheel is in turn rotatable according to the rotation of the steering mechanism 16 of the motorcycle.

The motorcycle suspension 4 further includes a shock absorber unit 40 comprising a spring 44 and a shock absorber 48; preferably, spring 44 and the shock absorber unit 48 are coaxial to each other and are arranged in parallel.

The shock absorber unit 40 extending from an attachment head 52, at which it is mechanically connected to the steering bar 12, to an attachment foot 56, at which it is mechanically connected to said support 32.

Preferably, the attachment head 52 and the attachment foot 56 are aligned along a vertical direction Y-Y that is perpendicular to the rotation axis X-X of wheel 20.

According to an embodiment, the attachment head 52 is attached to the steering bar 12 by means of an interposed elastic bush 60. Such an elastic bush 60 is able to allow small misalignments and rotations between the attachment head 52 and the steering bar 12.

According to an embodiment, the shock absorber unit 48 includes a lining 64 and a stem 68 housed and sliding, at least partly, within said lining 64; preferably, lining 64 includes the attachment foot 56.

Advantageously, at said attachment foot 56, the shock absorber unit 40 connects to support 32 by means of interposed mechanical coupling means 70 which define a hinge axis H-H contained in a plane perpendicular to the rotation axis of the wheel X-X, so as to fix the attachment foot 56 to support 32 and to permit a relative rotation of the attachment foot 56 in relation to support 32, around said hinge axis H-H.

Such mechanical coupling means 70 mechanically connect the attachment foot 56 to support 32 so as to prevent mutual translations along the vertical direction Y-Y and, at the same time, they turnably uncouple the attachment foot 56 from support 32 and from wheel 20 so as to allow mutual rotations, particularly of the attachment foot 56, about said hinge axis H-H.

By rotational uncoupling it is therefore meant that any stresses coming from wheel 20 do not impose rotations and/or bending of the attachment foot 56 about said hinge axis H-H.

Moreover, said mechanical coupling means 70 prevent any rotation of the attachment foot 56 about a rotation axis parallel to the rotation pin X-X of wheel 20.

According to one embodiment, said mechanical coupling means 70 comprise a flexible joint suitable for allowing a relative rotation of the attachment foot 56 relative to support 32, about said hinge axis H-H. Preferably, said elastic joint is asymmetric so as to be elastically deformable only about said hinge axis H-H. Said elastic joint can for example be made of metal, polymeric material or a combination of these materials.

According to one embodiment, the shock absorber unit 40, at said attachment foot 56, connects to support 32 by the interposition of a hinge 72, said hinge 72 defining a hinge axis H-H which is contained in a plane perpendicular to the rotation axis X-X of wheel 20.

Preferably, the hinge axis H-H is perpendicular to the vertical direction Y-Y defined by the shock absorber unit 40.

According to one embodiment, said hinge 72 comprises a silent-block type bush 76 which at least partially encloses a connection pin 80 between support 32 and the attachment foot 56, said connection pin 80 defining the hinge axis H-H.

According to one embodiment, hinge 72 comprises at least one support bearing or bush 84 which at least partially encloses the connection pin 80 between support 32 and the attachment foot 56, said connection pin 80 defining the hinge axis H-H.

According to one embodiment, hinge 72 includes a connection pin 80 and a pair of protuberances 88 arranged on opposite sides with respect to an intermediate portion 92 of said connection pin 80 along the hinge axis H-H; in this way, protuberances 88 house opposite axial ends 96 of the connection pin 80; in yet other words, the intermediate portion 92 of the connection pin 80 is cantilever between protuberances 88 which house and support the axial ends 96.

According to an embodiment, support bearings or bushes 84 are positioned between each of said protuberances 88 and the respective axial ends 96 of the connection pin 80.

According to a possible embodiment, said support bearings 84 are roller type bearings 100.

According to an embodiment, a bracket 104 is rigidly attached to support 32 which houses a portion of the rotation pin 36 of wheel 20 so as to turn; a disc brake caliper 108 is joined to said bracket 104 for the associable wheel 20.

For example, bracket 104 is comprised between support 32 and a hub 112 of wheel 20, along an axial direction parallel to the rotation axis X-X of the wheel.

Preferably, said hub 112 is rigidly fixed in rotation a brake disk 116; hub 112 is in turn integral in rotation with wheel 20 and includes bearings which support in rotation, at least partially, the rotation pin 36 of wheel 20.

The oscillating bar 24 typically has a rectilinear shape between the first and second ends 26, 28.

According to an embodiment, the oscillating bar 24 has a concavity 120 facing towards the attachment foot 56 of the shock absorber unit 40, said concavity 120 partially housing the foot itself.

According to a further embodiment, the oscillating bar 24 has an overall "V" shape so as to present a concavity 120 facing towards the attachment foot 56 of the shock absorber unit 40, said concavity 120 at least partially housing the foot itself.

According to a possible embodiment, the oscillating bar 24 has an overall "V" shape so as to present a concavity 120 facing towards the attachment foot 56 of the shock absorber unit 40; said concavity 120 is shaped so as to at least partially house the attachment foot itself.

In this way, it is possible to use an oscillating bar 24 having limited dimensions, without interfering with the overall dimensions of the attachment foot 56 provided with the respective hinge 72.

The operation of a motorcycle suspension according to the present invention shall now be described.

In particular, the suspension with oscillating bar is able, in a known manner, both of steering wheel 20, through the steering mechanism 16 connected to the steering bar 12, and of guiding the vertical shaking of wheel 20 by means of the shock absorber unit 40 provided with spring 44 and relative shock absorber 48.

The shock absorber unit 40, in theoretical conditions, works in a pure axial compression condition, with respect to said vertical direction Y-Y that connects the attachment head 52 with the attachment foot 56; in the case where due to mechanical stresses and/or clearances between the couplings of the various organs making up the suspension, there is a tendency to misalignment between the attachment head and foot 52, 56, thanks to the mechanical coupling means 70, the portion of the shock absorber unit comprising the attachment foot 56 is able to rotate about the connection pin 80 so as to adapt to such deformations/misalignments, thus preventing excessive friction and resistance to the sliding of the shock absorber unit 40. In other words, the portion of shock absorber unit 48 provided with the attachment foot 56, typically lining 64, rotating about the mechanical coupling means 70, reduces the stresses and improves the sliding of the shock absorber unit. Therefore, stem 68 will encounter a lower resistance to sliding within lining 64.

At the same time, the mechanical coupling means 70, such as hinge 72 or the connection pin 80, prevent any rotation of the attachment foot 56 about a rotation axis parallel to the rotation pin of wheel 20; this is due to the fact that the hinge axis H-H is contained in a plane perpendicular to the rotation axis X-X. In this way, the mechanical coupling means 70 on the one hand allow geometric adaptations of the attachment foot 56 which favor the sliding of the shock absorber unit 40, and on the other hand they do not affect in any way the stiffness of the connection between foot 56 itself and support 32 so that there are never rotations of the foot parallel to the rotation axis X-X.

In this way it is also possible to use bracket 104 supporting the disc brake caliper 108 without affecting the operation of the shock absorber unit by the reaction torque transmitted to support 32 and to the attachment foot 56 by the caliper itself.

As can be understood from the description, the suspension according to the invention allows overcoming the drawbacks of the prior art.

In particular, the invention always allows easy sliding of the shock absorber unit. In fact, even in case of strong stresses and/or clearances and misalignments, the shock absorber unit, thanks to the hinge, is always able to adapt to the deformation and/or misalignment so as to accommodate the movements of the components of the unit without increasing frictions and related jamming.

In other words, the shock absorber unit does not oppose deformations or misalignment but follows and favors them in order to prevent jamming in the rectilinear sliding motion between the lining and the stem of the shock absorber unit.

If the foot of the shock absorber unit is fixed to a bracket which also supports a motorcycle brake, the torque transmitted by said brake is supported by the mechanical coupling means without imposing any rotation to the same means, since the hinge axis of the mechanical coupling means is contained in a plane perpendicular to the rotation axis of the wheel.

Thus, the presence of the pin at the foot of the shock absorber unit does not affect in any way the operation of the brake but merely accommodates the deformations and misalignment between the lining and the stem so as to ensure the maximum possible sliding of the shock absorber unit.

Finally, the solution of the present invention allows facilitating the mounting of the suspension, at the factory and during maintenance, since the system automatically compensates for any misalignment actually increasing the alignment tolerances.

A man skilled in the art may make several changes and adjustments to the suspensions described above in order to meet specific and incidental needs, all falling within the scope of protection defined in the following claims.

The invention claimed is:

1. Motorcycle suspension comprising:
   a fork having a steering bar suitable for connecting mechanically to a steering mechanism of a motorcycle,
   an oscillating bar having a first end at which it forms a junction with said steering bar, and a second end at which it connects to a support which houses a rotation pin of an associable wheel so as to turn, the rotation pin defining a rotation axis for the wheel,
   a shock absorber unit, comprising a spring and a shock absorber, the unit extending from an attachment head, at which it is mechanically connected to the steering bar, to an attachment foot, at which it is mechanically connected to said support,
   wherein at said attachment foot, the shock absorber unit connects to the support by means of interposed mechanical coupling means which define a hinge axis (H-H) contained in a plane perpendicular to the rotation axis of the wheel, so as to fix the attachment foot to the support and to permit a relative rotation of the attachment foot in relation to the support, around said hinge axis,
   wherein said mechanical coupling means comprise a hinge having a hinge axis which is contained in a plane perpendicular to the rotation axis of the wheel,
   wherein said hinge comprises at least one support bearing or bush which at least partially encloses a connection pin between the support and the attachment foot said connection pin defining the hinge axis.

2. Suspension according to claim 1, wherein said bush comprises a silent-block bush.

3. Suspension according to claim 1, wherein said hinge comprises a connection pin and a pair of protuberances positioned on opposite sides of an intermediate portion of said connection pin, the protuberances housing opposite axial ends of the connection pin.

4. Suspension according to claim 3, wherein support bearings or bushes are positioned between each of said protuberances and the respective axial ends of the pin.

5. Suspension according to claim 4, wherein said support bearings comprise roller bearings.

6. Suspension according to claim 1, wherein a bracket is rigidly attached to said support which houses a portion of the rotation pin of the wheel so as to turn, a disc brake caliper being joined to said bracket for the associable wheel.

7. Suspension according to claim 6, wherein said bracket is comprised between the support and a hub of the wheel, along an axial direction parallel to the rotation axis of the wheel.

8. Suspension according to claim 1, wherein the attachment head is attached to the steering bar by means of an interposed elastic bush.

9. Suspension according to claim 1, wherein the oscillating bar has a concavity facing towards the attachment foot of the shock absorber unit, said concavity partially housing said foot.

10. Suspension according to claim 1, wherein the oscillating bar has an overall "V" shape so as to present a concavity facing towards the attachment foot (56) of the shock absorber unit, said concavity at least partially housing said foot.

11. Suspension according to claim 1, wherein said shock absorber unit comprises a shock absorber having a lining and a stem housed and sliding, at least partially, inside said lining, said lining comprising the attachment foot.

12. Motorcycle suspension comprising:
   a fork having a steering bar suitable for connecting mechanically to a steering mechanism of a motorcycle,
   an oscillating bar having a first end at which it forms a junction with said steering bar, and a second end at which it connects to a support which houses a rotation pin of an associable wheel so as to turn, the rotation pin defining a rotation axis for the wheel,
   a shock absorber unit, comprising a spring and a shock absorber, the unit extending from an attachment head, at which it is mechanically connected to the steering bar, to an attachment foot, at which it is mechanically connected to said support,
   wherein at said attachment foot, the shock absorber unit connects to the support by means of interposed mechanical coupling means comprising a hinge defining a hinge axis (H-H) contained in a plane perpendicular to the rotation axis of the wheel, so as to fix the attachment foot to the support and to permit a relative rotation of the attachment foot in relation to the support, around said hinge axis, wherein said hinge comprises a connection pin and a pair of protuberances positioned on opposite sides of an intermediate portion of said connection pin, the protuberances housing opposite axial ends of the connection pin, wherein support bearings or bushes are positioned between each of said protuberances and the respective axial ends of the pin.

13. Motorcycle suspension comprising:

a fork having a steering bar suitable for connecting mechanically to a steering mechanism of a motorcycle, an oscillating bar having a first end at which it forms a junction with said steering bar, and a second end at which it connects to a support which houses a rotation pin of an associable wheel so as to turn, the rotation pin defining a rotation axis for the wheel, a shock absorber unit, comprising a spring and a shock absorber, the unit extending from an attachment head, at which it is mechanically connected to the steering bar, to an attachment foot, at which it is mechanically connected to said support, wherein at said attachment foot, the shock absorber unit connects to the support by means of interposed mechanical coupling means which define a hinge axis (H-H) contained in a plane perpendicular to the rotation axis of the wheel, so as to fix the attachment foot to the support and to permit a relative rotation of the attachment foot in relation to the support, around said hinge axis, wherein a bracket is rigidly attached to said support which houses a portion of the rotation pin of the wheel so as to turn, a disc brake caliper being joined to said bracket for the associable wheel.

* * * * *